United States Patent [19]

Grall

[11] 4,234,939
[45] Nov. 18, 1980

[54] ARRAY SYSTEM WITH A HIGH RESOLVING POWER

[75] Inventor: Georges Grall, Paris, France

[73] Assignee: Thomson-CSF, Paris, France

[21] Appl. No.: 968,815

[22] Filed: Dec. 12, 1978

[30] Foreign Application Priority Data

Dec. 16, 1977 [FR] France ................................ 77 38092

[51] Int. Cl.³ ............................................. G01S 15/06
[52] U.S. Cl. ........................................ 367/87; 367/99;
367/105; 367/905
[58] Field of Search ................ 367/122, 123, 125, 126,
367/87, 99, 105, 905; 343/100 LE

[56] References Cited

U.S. PATENT DOCUMENTS 4,068,234   1/1978   O'Meara ........................... 367/87

OTHER PUBLICATIONS

Endoh et al, Res. Lab. Precis. Mach. & Electronics, Bull. P.M.E. (T.I.T.), No. 37, Mar. 1976, pp. 1-6.

Primary Examiner—Richard A. Farley
Attorney, Agent, or Firm—Cushman, Darby & Cushman

[57] ABSTRACT

A high resolving power arrangement of transmitting and receiving transducer for arrays the detection of targets in a wave detection system such as sonar. The arrangement includes a transmitting array including two transducers ($T_1$) and ($T_n$) transmitting in synchronism or alternatively in phase opposition and a receiving array including transducers $T_1, T_2 \ldots T_n$ associated respectively with multiple connector phase shifters ($D_1$), ($D_2$) . . . ($D_n$).

5 Claims, 9 Drawing Figures

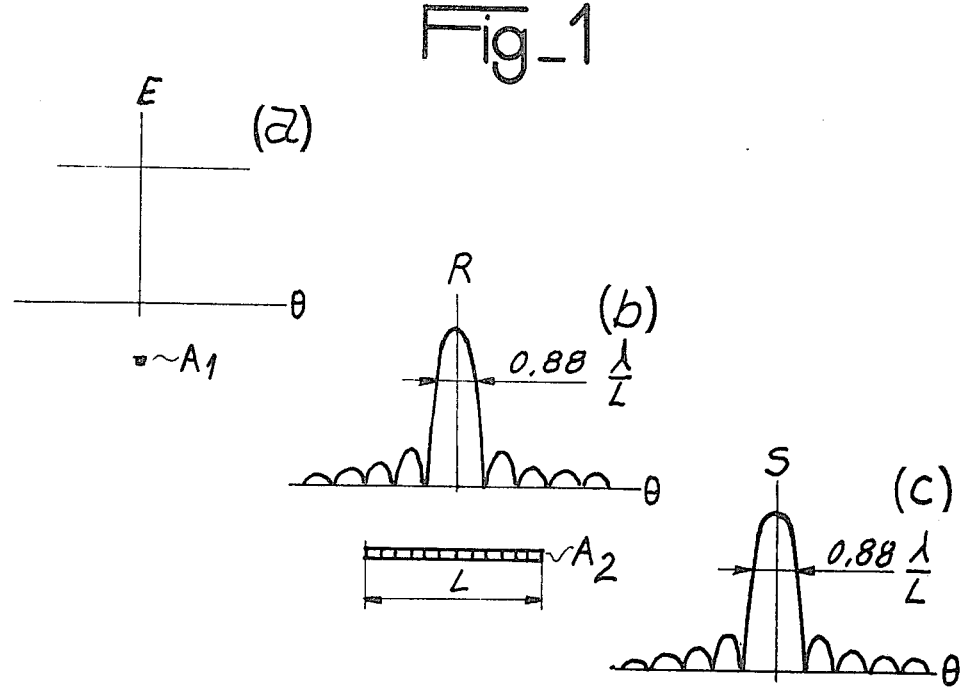
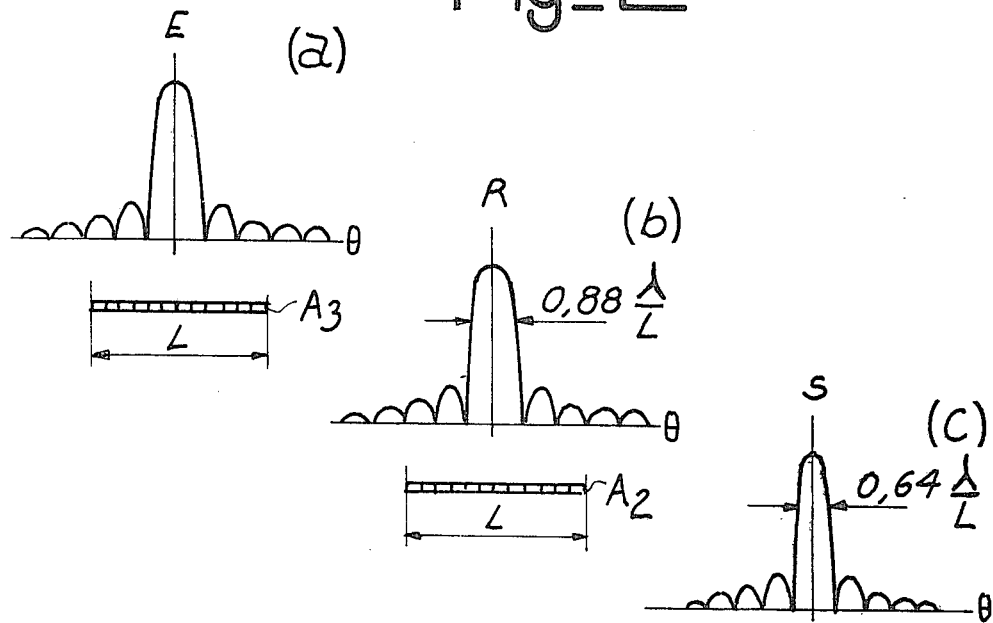

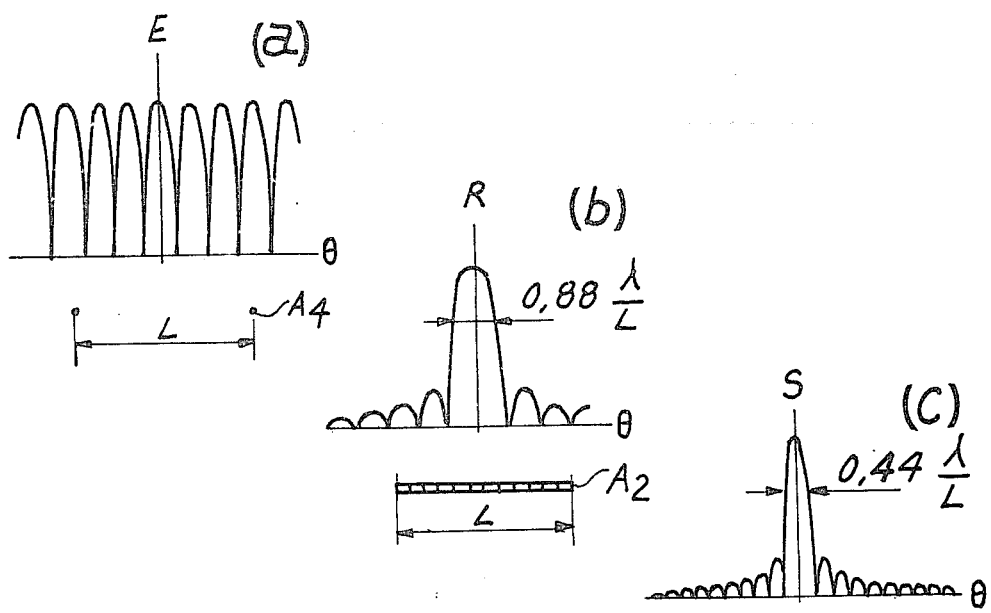
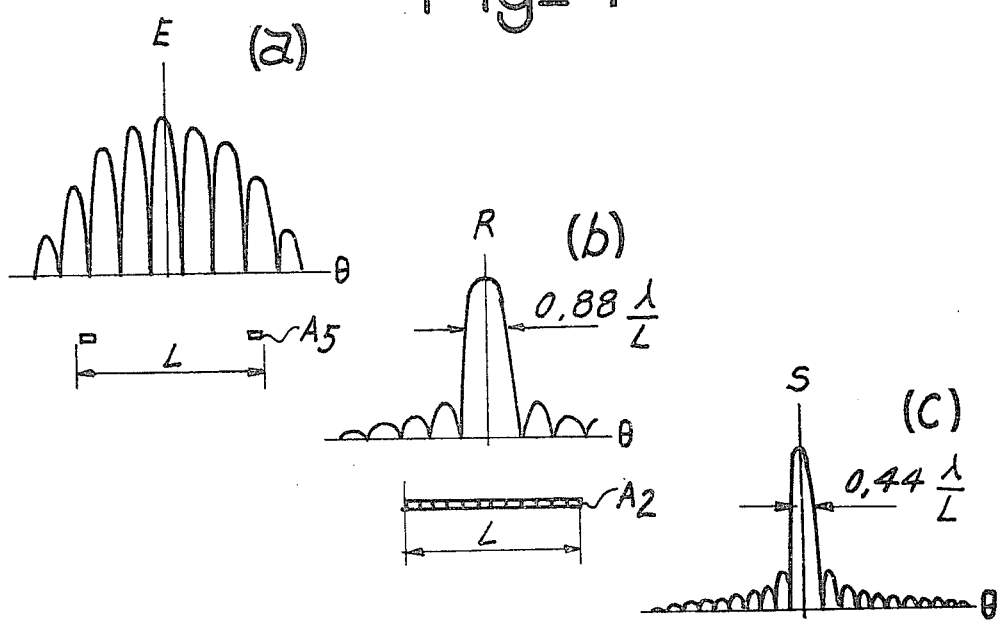

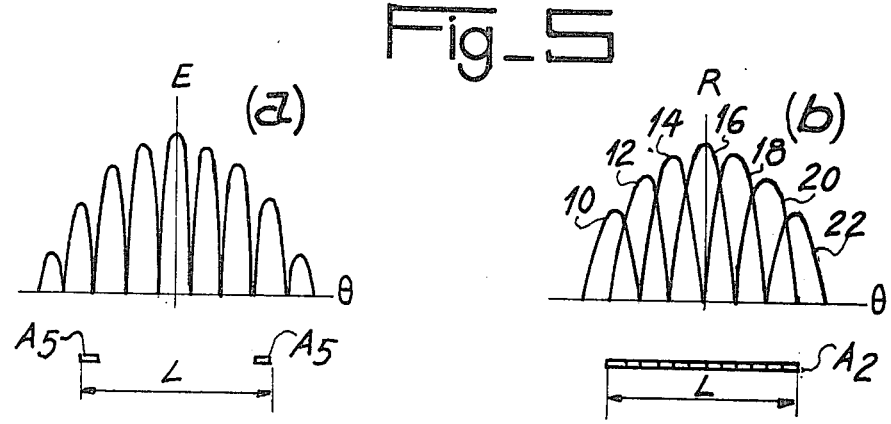
Fig_5
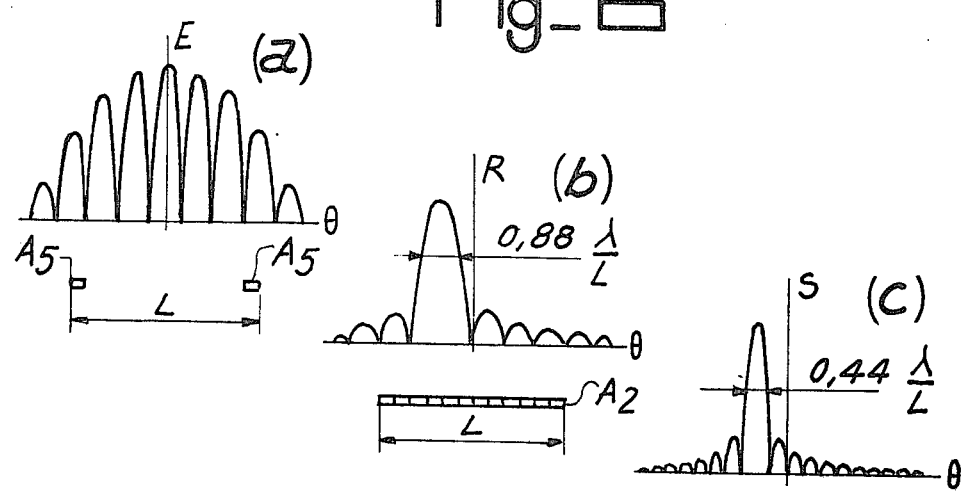
Fig_6
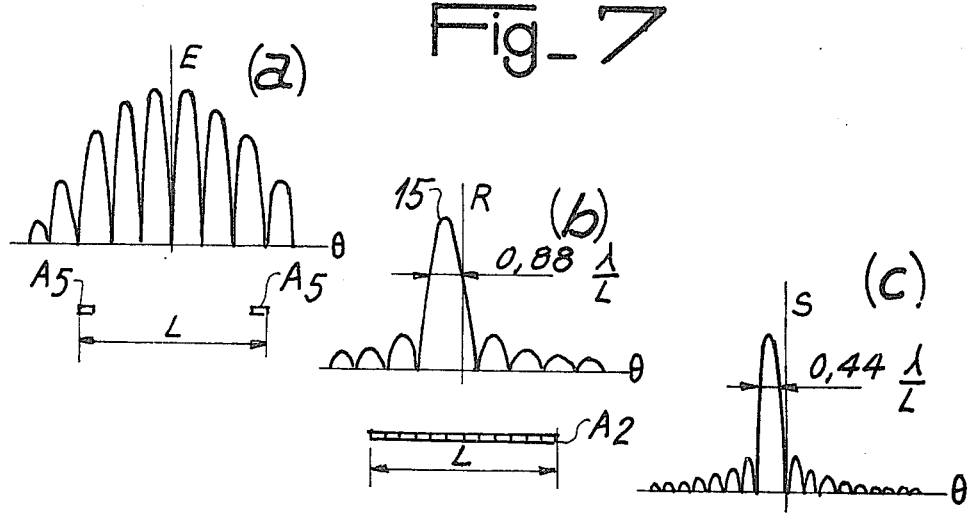
Fig_7

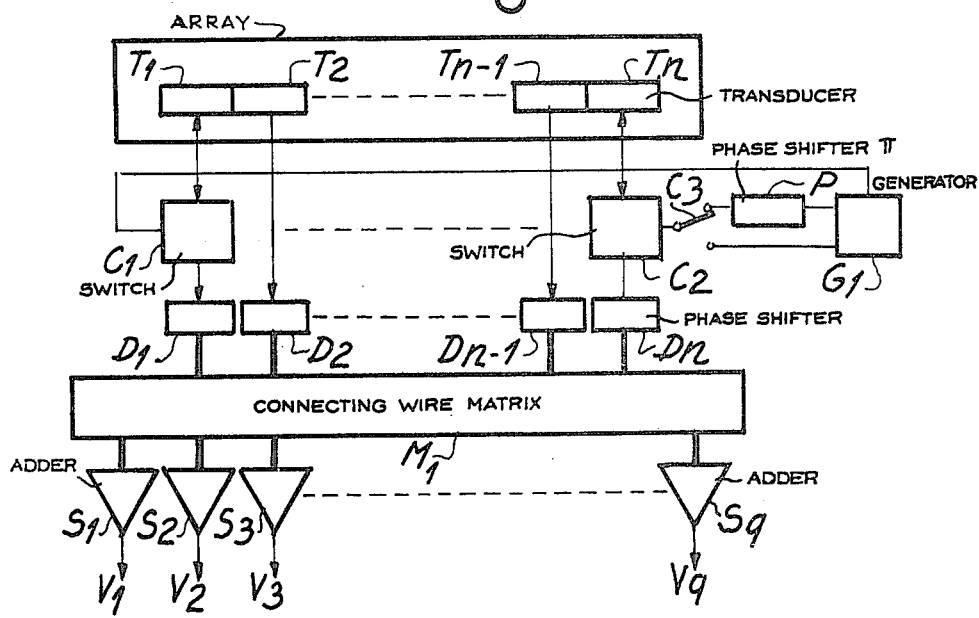
Fig_8
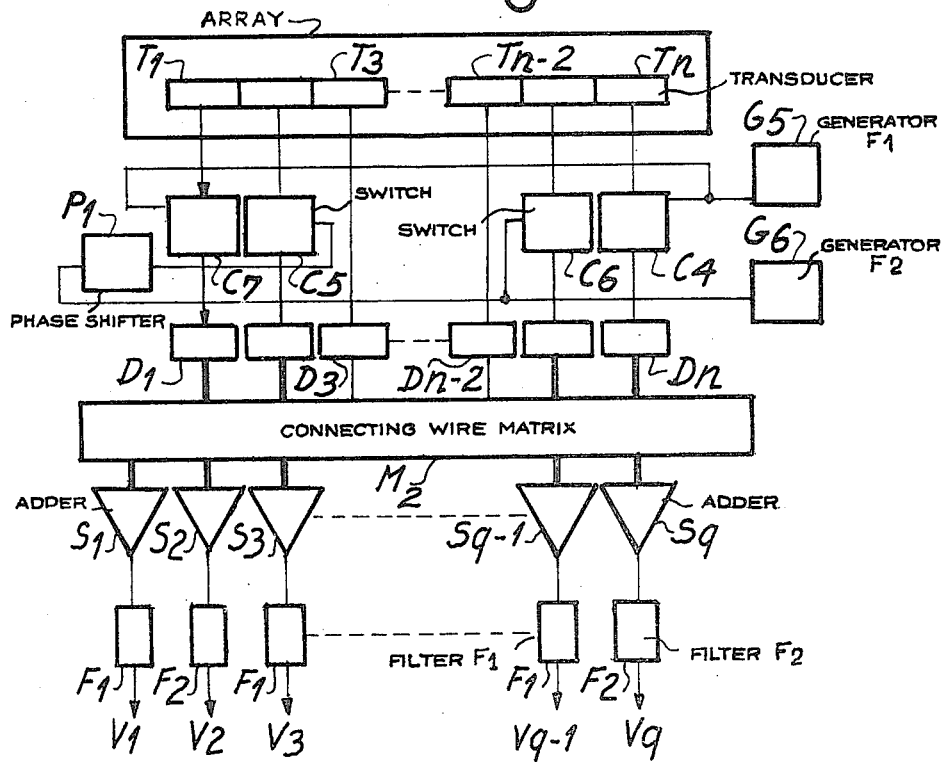
Fig_9

ARRAY SYSTEM WITH A HIGH RESOLVING POWER

The present invention relates to a system of arrays having a high resolving power.

The invention relates more particularly to the detection of targets in a wave detection system, particularly sonar, wherein waves are transmitted and then received after reflection from one or several targets by non-identical transmitting and receiving arrays.

In such a system, the aim is more particularly to obtain an angular resolving power, that is to say the ability of the array system to distinguish between two targets that are close to one another, said power being optimum in view of the dimensions of the transmitting and receiving arrays.

There are known array systems for which an attempt has been made to obtain such a resolving power.

It is known to associate a practically omni-directional transmitting array with a receiving array, composed of transducers side by side along a line with a total length L. Such a receiving array is said to be "filled".

It is also known to associate a filled transmitting array with a filled receiving array. In this case, a single array can, owing to the reversibility of the transducers, perform the functions both of transmitting array and of receiving array.

The resolving power of a device with filled transmitting and receiving arrays is known, if the amplitude and phase are constant for all the transducers. The same is true if the amplitude is constant and the phase increases by a constant value from one transducer to the other.

It has been proposed to increase the resolving power obtained for an array, having constant amplitude and phase, by means of a certain distribution of amplitude and phase along the array. Such an array, is called "superdirective". It is known that such a device necessitates the use of considerable means and that the results are unsatisfactory.

Another means has also been proposed in order to obtain a high resolving power, using multiplying arrays. Such a device has the drawback that the resolving power depends on the characteristics of the target to be detected.

The device according to the invention increases the resolving power of a receiving array and transmitting array system considerably, for given dimensions, in relation to prior art, without having the disadvantages of "superdirective" and multiplying arrays.

According to the present invention, the transmitting and receiving arrays extend over substantially equal lengths and comprise transducers distributed over these lengths, with a filled receiving array and a transmitting array including at least two transducers.

According to a preferred feature of the invention, the receiving array has channels that are pre-formed and centered on the maxima of the transmitting array.

This system has an advantage over the prior art, not only owing to the increase in resolving power but also owing to an increase in range for the same transmission power. Other features and advantages will become apparent from the description of forms of embodiment, illustrated by the accompanying drawings, which represent:

FIG. 1, the Cartesian diagrams of an omni-directional transmission array and of a filled receiving array, as well as the overall transmission-reception pattern.

FIG. 2, the Cartesian diagrams for a filled transmitting array and a filled receiving array, as well as the overall transmission-reception pattern.

FIG. 3, the Cartesian diagrams of a transmitting antenna composed of two transducers of negligible dimensions transmitting in synchronism, of a filled receiving array, as well as the overall transmission-reception pattern.

FIG. 4, the Cartesian diagrams of a transmitting array composed of two transducers of non-negligible dimensions transmitting in synchronism, of a filled receiving array, as well as the overall transmission-reception pattern.

FIG. 5, the Cartesian diagrams of a transmitting antenna composed of two transducers transmitting in synchronism and of the receiving antenna with pre-formed channels.

FIG. 6, the Cartesian diagrams of a transmitting antenna composed of two transducers transmitting in synchronism, of a receiving channel centered on a maximum of transmission, as well as the overall transmission-reception pattern.

FIG. 7, the Cartesian diagrams of a transmitting array composed of two transducers transmitting in phase opposition, of a receiving channel centered on a maximum of transmission, as well as the overall transmission-reception pattern.

FIGS. 8 and 9, two exemples of embodiment, comprising the transmitting receiving device with the forming of channels, according to the invention.

The resolving power of a detection system such as a radar or a sonar system depends both on the pattern of the transmitting array $E(\theta)$ and of the pattern of the receiving array $R(\theta)$, $\theta$ being the angle of a direction of observation with an axis connected to the array.

The signal received by the receiving array (3) is proportional to $S(\theta)$, with:

$$S(\theta) = E(\theta) \times R(\theta)$$

It is known to be possible to calculate for an array both the transmission pattern and the reception pattern by means of a Fourrier transform, on the basis of the amplitude distribution on the array. In the scope of the present invention, more particular interest is attached to an array with a length L and a height that is negligible in relation to L. If $a(\chi)$ is the distribution of amplitude along this array, we find the patterns $A(\theta)$ from the relationship:

$$A(\theta) = \int_{-L/2}^{+L/2} a(\chi) \exp(j\frac{2\pi}{\lambda} \times \sin\theta) \, dx \qquad (1)$$

wherein $\lambda$ is the wavelength in the medium of propagation and $j = \sqrt{-1}$.

If the amplitude is constant, which is often the case of a so-called "filled" array, $A(\theta)$ is found from (1) to within a multiplication constant:

$$A(\theta) = \sin\left(\frac{\pi L \sin\theta}{\lambda}\right) / \left(\frac{\pi L \sin\theta}{\lambda}\right) \qquad (2)$$

We thus find that the angular width $2\theta_o$ at 3 dB of the patterns is such that:

$$2\theta_o = 0.88\lambda/L \qquad (3)$$

In order to find (3) sin $\theta$ has been replaced by $\theta$; this approximation is practical and will be continually used below to facilitate the explanation.

The transmitting array according to the invention comprises preferentially two transducers placed at the two extremities of the array.

Such an array will be called an "interferometric" antenna below.

If l is the length along the antenna of each of the transducers and if the two transducers transmit in synchronism, the transmission pattern $E(\theta)$ will be given by:

$$E(\theta) = \cos(\frac{\pi L \sin \theta}{\lambda}) \times t \quad (4)$$

$$\text{with } t = \sin(\frac{\pi l \sin \theta}{\lambda}) / (\frac{\pi l \sin \theta}{\lambda}) \quad (5)$$

If the two transducers transmit in phase opposition, we find for $E(\theta)$:

$$E(\theta) = \sin(\frac{\pi L \sin \theta}{\lambda}) \times t \quad (6)$$

If l is small in relation to $\lambda$, t will be practically equal to 1.

In order to demonstrate the advantage of the arrangement of the interferometric antenna in transmission, it will be compared with those of the prior art.

In FIG. 1, we have considered a transmitting antenna $A_1$ composed of a transducer that is small in size in relation to the wavelength.

In this way, we obtain a pattern $E(\theta)$ of an omnidirectional type as shown in FIG. 2a. With this transmitting array is associated a filled array $A_2$ wherein $R(\theta)$ is given by the relationship (2), (FIG. 1b). $S(\theta)$ is also found to be given by the relationship (2), (FIG. 1c). $S(\theta)$ has in this case an angular width at 3 dB of 0.88 $\lambda/L$. Another example is shown in FIG. 2. The transmitting array $A_3$ (FIG. 2a) and the receiving array $A_2$ (FIG. 2b) are filled, $E(\theta)$ and $R(\theta)$ are given by the relationship (2) and $S(\theta)$ is thus given by:

$$S(\theta) = E(\theta) \times R(\theta) = \left[\sin(\frac{\pi L \sin \theta}{\lambda}) / (\frac{\pi L \sin \theta}{\lambda})\right]^2$$

$S(\theta)$ is represented in FIG. 2c, the angular width at 3 dB in this diagram is 0.64 $\lambda/L$.

FIGS. 3 and 4 show the advantage of the interferometric array in transmission. For dimensions of the transducers $A_4$, (FIG. 3a) that are negligible in relation to the wavelength, $E(\theta)$ is given by the relationship (4) with t = 1. It has been supposed that the two transducers are synchronous. The receiving array $A_2$ (FIG. 3b) is filled and $R(\theta)$ is given by the relationship (2).

We then find for $S(\theta)$:

$$S(\theta) = \sin(\frac{2\pi L \sin \theta}{\lambda}) / (\frac{2\pi L \sin \theta}{\lambda})$$

and the width of $S(\theta)$ at 3 dB is 0.44$\lambda/L$.

In FIG. 4, we have considered the case of transducers $A_5$, (FIG. 4a) of non-negligible dimensions in relation to the wavelength.

The filled receiving array $A_2$ with $R(\theta)$ are represented in FIG. 4b and finally $S(\theta)$, (FIG. 4c) is given by:

$$S(\theta) = t \times \sin(\frac{2\pi L \sin \theta}{\lambda}) / (\frac{2\pi L \sin \theta}{\lambda})$$

the width at 3 dB is practically equal to 0.44 $\lambda/L$, on the other hand, the secondary lobes are lowered in relation to the diagram in FIG. 3a.

For the purpose of detection by sonar, it is possible to pre-form channels.

Briefly, these pre-formed channels are obtained by the application of the electrical signals of the transducers forming the array to multiple connector type phase shifters, followed by adders. For a channel about the mean direction of angle $\theta_o$, the phase shifts between transducers for a wave from this direction are compensated.

For the system according to the invention, the mean direction of the channels coincides with the maxima of the transmission of the interferometric array.

The pattern of reception $R(\theta)$ for a pre-formed channel centered about $\theta_o$ is given by the relationship:

$$R(\theta) = \frac{\sin(\frac{\pi L}{\lambda}(\sin \theta - \sin \theta_0))}{\frac{\pi L}{\lambda}(\sin \theta - \sin \theta_0)} \times \frac{\sin(\frac{\pi b}{\lambda} \sin \theta)}{\frac{\pi b}{\lambda} \sin \theta}$$

where b is the length that a transducer occupies on the array.

Let us consider an interferometric array $A_5$ (FIG. 5a) with its pattern $E(\theta)$, the two sources being synchronous. We then determine the pre-formed channels (10), (12), (14), (16), (18), (20) and (22) of the filled antenna $A_2$, (FIG. 5b).

FIG. 6a represents an interferometric array with its pattern $E(\theta)$ and the reception pattern of a particular channel (FIG. 6b) centered on a maximum of $E(\theta)$. The overall pattern $S(\theta)$ is represented (FIG. 6c) with its width at 3 dB which is 0.44 $\lambda/L$. Given that $E(\theta)$ periodically becomes zero, there are directions for which there is no detection. In order to over come this drawback, the transducers are also supplied in phase opposition. $E(\theta)$ is then given by the relationship (6), (FIG. 7a) and pre-formed channels centered on these new maxima are then interposed. Such a channel (15) is illustrated in FIG. 7b as well as the overall pattern of this channel $S(\theta)$; the angular width at 3 dB is equal to 0.44 $\lambda/L$.

FIG. 8 represents an exemple of an arrangement according to the invention. The transmitting-receiving array is formed by the transducers $T_1, T_2 \ldots T_n$. Only transducers $T_1$ and $T_n$ are used for transmission, and $T_1, T_2 \ldots T_n$ are connected to the multiple connector phase shifters $D_1, D_2 \ldots D_n$. $M_1$ represents a matrix of wiring connecting the outputs of the phase shifters to the adders $S_1, S_2 \ldots S_q$.

Switches $C_1$ and $C_2$ make it possible to switch from transmission to reception and vice versa. The electric transmission signals are supplied by a generator $G_1$ of pulses at the selected frequency $E_1$ which is connected to $C_2$ via a switch $C_3$ and $\pi$ phase shifter P. The pulses supplied by $G_1$ are supplied to $C_1$ either directly or via P. The switch $C_1$ is directly connected to generator $G_1$.

This arrangment thus makes it possible to obtain an interferometric antenna with the two transducers alternately in phase and in phase opposition.

One sequence corresponds to the channels $V_1, V_3 \ldots$ and the other to $V_2, V_4 \ldots$.

Another example of embodiment is illustrated in FIG. 9.

The array is again composed of the transducers $T_1, T_2 \ldots T_n$ connected to the multi-connector phase shifters $D_1, D_2 \ldots D_n$. The outputs of the phase shifters are connected by a matrix of wiring $M_2$ to the adders $S_1, S_2 \ldots S_q$.

Transmission takes place simultaneously in frequencies $F_1$ and $F_2$. At frequency $F_1$, with $F_1 < F_2$, only the transducers $T_1$ and $T_n$ placed at a distance $L_1$ transmit. On the other hand, at the frequency $F_2$ it is another pair of transducers placed at a distance $L_2$ that transmit, wherein $L_1$ and $L_2$ are related as follows:

$$L_2 = L_1 F_1 / F_2 \tag{7}$$

This condition, which is given by the relationship (7) is necessary in order to compensate for the variation of the pattern with the frequency.

The generator $G_5$ of pulses at the frequency $F_1$ is connected to the tranducers $T_1$ and $T_n$ via switches $C_4$ and $C_7$.

A generator $G_6$ of pulses at the frequency $F_2$ is connected to another pair of transducers (in the FIGURE, $T_2$ and $T_{n-1}$ have been used) via the switches $C_5$ and $C_6$ and a phase shifter $P_1$ providing a phase shift $\pi$.

We thus obtain an interferometric array for which the transmission of the two transducers is synchronous for the frequency $F_1$ and in phase opposition for the frequency $F_2$.

At the output of adders $S_1, S_3, S_5 \ldots$ is placed a filter centered on $F_1$ and at the output of adders $S_2, S_4, S_6 \ldots$ a filter centered on $F_2$. At the output of the filters, we obtain channels $V_1, V_2 \ldots V_n$.

The patterns in FIGS. 6, 7 and 8 correspond to an underwater image type high frequency sonar system covering a sector of 28°.

Its characteristics are as follows:
Operating frequency: around 200 kHz
Number of pre-formed channels: 200
Width of the channels at half power: 0°.14
Transmission: complete coverage by two sequential transmissions at the same frequency.
Overall dimensions of the acoustic arrays: 200$\lambda$
Length of the transducers: 2$\lambda$ A length of 2$\lambda$ is chosen preferentially for the transducers so as to cover only the 28° of the angular sector and to obtain a sufficient transmission area.

The frequencies selected in a form of embodiment corresponding to FIG. 9 are: $F_1 = 190$ kHz and $F_2 = 210$ kHz.

One advantage of using two transducers for transmission of the interferometric type, in relation to a single source, is that is it possible to transmit, for an equal energy density, an amplitude that is twice as large in the medium of radiation, that is to say 4 times greater apparent power (the power gain of the antenna is said in this case to be 2, i.e. +3 dB).

There is also another advantage in the situation that is a corollary to that which has just be described: it is desired to conserve in the radiation medium, using 2 interferometric sources of the invention, an apparent power that is identical to that obtained with a single source, in this case, the amplitude of each of these sources can be divided by two, which means that the power applied thereto is divided by four.

What is claimed is:

1. An array system for the detection of targets in a wave system, in particular sonar with a high resolving power, comprising: an array of transmitting transducers and an array of receiving transducers, each array having substantially the same length L, said receiving array comprising a plurality of transducers distributed over said length L, phasing means connected to said transducers for pre-forming q channels in q directions, each of said channels having a reception pattern directed at one of said q directions, said transmitting array comprising first and second transmitting transducers connected to a generator said first and second transmitting transducers being placed at the extremities of the transmitting array, the radiation pattern of said transmitting array having a series of maxima and minima and the transmission-reception assembly having an overall pattern with an angular width at 3 dB that is less than 0.64 $\lambda/L$, wherein $\lambda$ is the wavelength in the medium of propagation and the centre of the pre-formed channels corresponds to the directions of the maxima of transmission.

2. An array system according to claim 1, further comprising a sequentially operated switch having an input and first and second outputs, said input being connected to said generator, said first output being connected to said first transmitting transducer and said second output being connected said second transmitting transducer via a $\pi$ phase-shifter, wherein the centers of said pre-formed channels are the transmitting maxima of two sequencies.

3. An array system according to claim 2 wherein a single array is used for transmission and reception said single array being constituted by a plurality of transducers wherein the end transducers are reversible and are used for transmission as well as reception.

4. An array system comprising: a first transmitting array of transducers including first and second transducers and a first receiving array of transducers each of said first arrays substantially having a length $L_1$ and operating at a first frequency $F_1$, a second transmitting array of transducers including third and fourth transducers and a second receiving array of transducers each of said second arrays substantially operating at a second frequency $F_2$ and having substantially length $L_2$, where $L_2 = L_1 F_1/F_2$, first generator means at frequency $F_1$ and second generator means at frequency $F_2$, the first and second transducers being connected to said first generator, said third transducer being connected to said second generator and said fourth transducer being connected to said second generator via a $\pi$ phase-shifter at frequency $F_2$, pre-forming channel means being connected to the transducers of said first and second receiving array which are connected to filters means centered respectively at frequencies $F_1$ and $F_2$, the so pre-formed channels corresponding to the directions of the maxima of transmission for the two frequencies.

5. An array system according to claim 4, wherein said single array is used for transmission and reception, said array being constituted by a plurality of transducers and two pairs of said plurality of transducers are reversible and serving for the transmision at frequencies $F_1$ and $F_2$.

* * * * *